(12) United States Patent
Froehlich et al.

(10) Patent No.: US 10,752,445 B2
(45) Date of Patent: Aug. 25, 2020

(54) MODULAR CONVEYING UNIT

(71) Applicant: SIEMENS AKTIENGESELLSCHAFT, Munich (DE)

(72) Inventors: Thomas Froehlich, Allensbach (DE); Alexander Schnurr, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/483,265

(22) PCT Filed: Dec. 21, 2017

(86) PCT No.: PCT/EP2017/084106
§ 371 (c)(1),
(2) Date: Aug. 2, 2019

(87) PCT Pub. No.: WO2018/141465
PCT Pub. Date: Aug. 9, 2018

(65) Prior Publication Data
US 2020/0010275 A1    Jan. 9, 2020

(30) Foreign Application Priority Data
Feb. 2, 2017  (EP) ..................... 17154331

(51) Int. Cl.
*B65G 13/10*  (2006.01)
*B65G 47/244*  (2006.01)

(52) U.S. Cl.
CPC .......... *B65G 13/10* (2013.01); *B65G 47/244* (2013.01); *B65G 2207/30* (2013.01); *B65G 2207/34* (2013.01)

(58) Field of Classification Search
CPC ...... B65G 13/10; B65G 47/244; B65G 47/54; B65G 2207/30; B65G 2207/34
See application file for complete search history.

(56) References Cited

U.S. PATENT DOCUMENTS 6,889,815 B2 * 5/2005 Kanamori ............ B65G 1/0478
198/369.4
7,040,478 B2 * 5/2006 Ehlert .................... B65G 13/10
198/369.4

(Continued)

FOREIGN PATENT DOCUMENTS

WO        2015106765 A1    7/2015

*Primary Examiner* — Gene O Crawford
*Assistant Examiner* — Keith R Campbell
(74) *Attorney, Agent, or Firm* — Laurence Greenberg; Werner Stemer; Ralph Locher

(57) ABSTRACT

A conveying unit for a superordinate conveying system for transporting goods on a transport plane. The conveying unit has transport rollers, drive devices, at least one adjustment apparatus and a control unit. The transport rollers rotate about axes at an actuatable rotational speed and with an actuatable direction of rotation. The drive device can be actuated to drive the transport rollers. The axes of rotation of the transport rollers can be actuated about their respective pivot axes by their own pivot axis angle and can be adjusted by rotation. The adjustment apparatus can be actuated to adjust the axes of rotation of the transport rollers about their respective pivot axes. The control unit actuates the conveying unit, and the conveying unit additionally has a connection apparatus for connecting the conveying unit to the superordinate conveying system.

16 Claims, 4 Drawing Sheets

(56) References Cited

U.S. PATENT DOCUMENTS

| | | | |
|---|---|---|---|
| 9,499,341 B2 * | 11/2016 | Wilkins | B65G 13/065 |
| 9,878,856 B2 * | 1/2018 | Specht | B65G 13/10 |
| 10,081,495 B2 * | 9/2018 | Moller | B65G 39/025 |
| 2003/0234155 A1 | 12/2003 | Kanamori et al. | |
| 2005/0040009 A1 | 2/2005 | Ehlert | |
| 2013/0126300 A1 | 5/2013 | Wolkerstorfer et al. | |
| 2016/0145053 A1 * | 5/2016 | Vetter | B65G 47/244 |
| | | | 198/401 |

\* cited by examiner

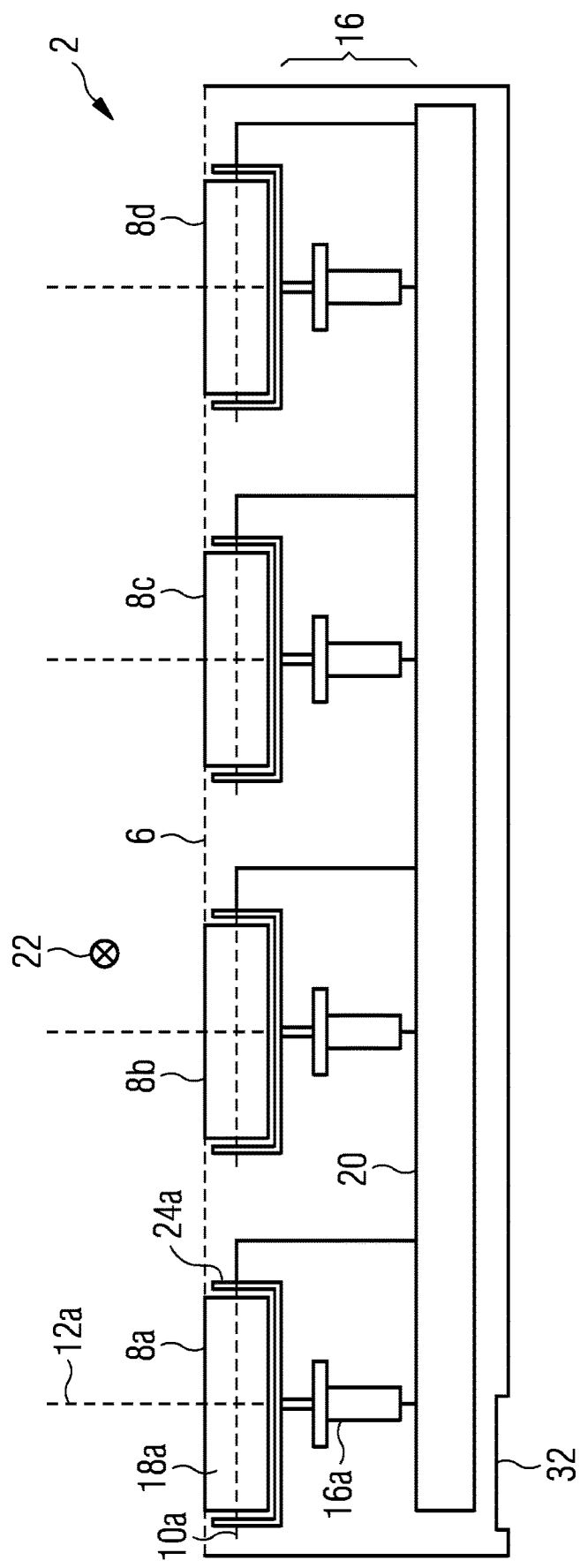

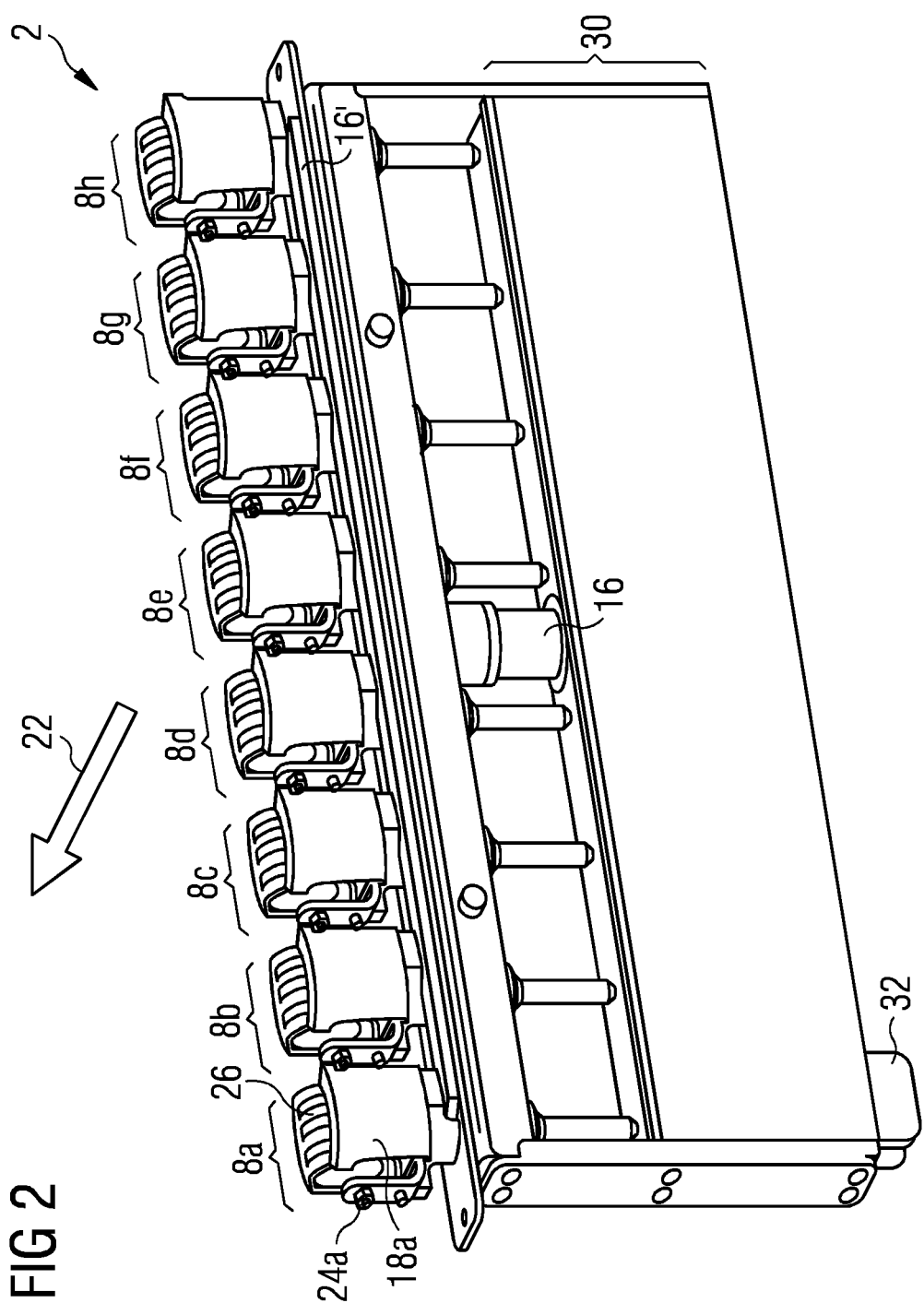

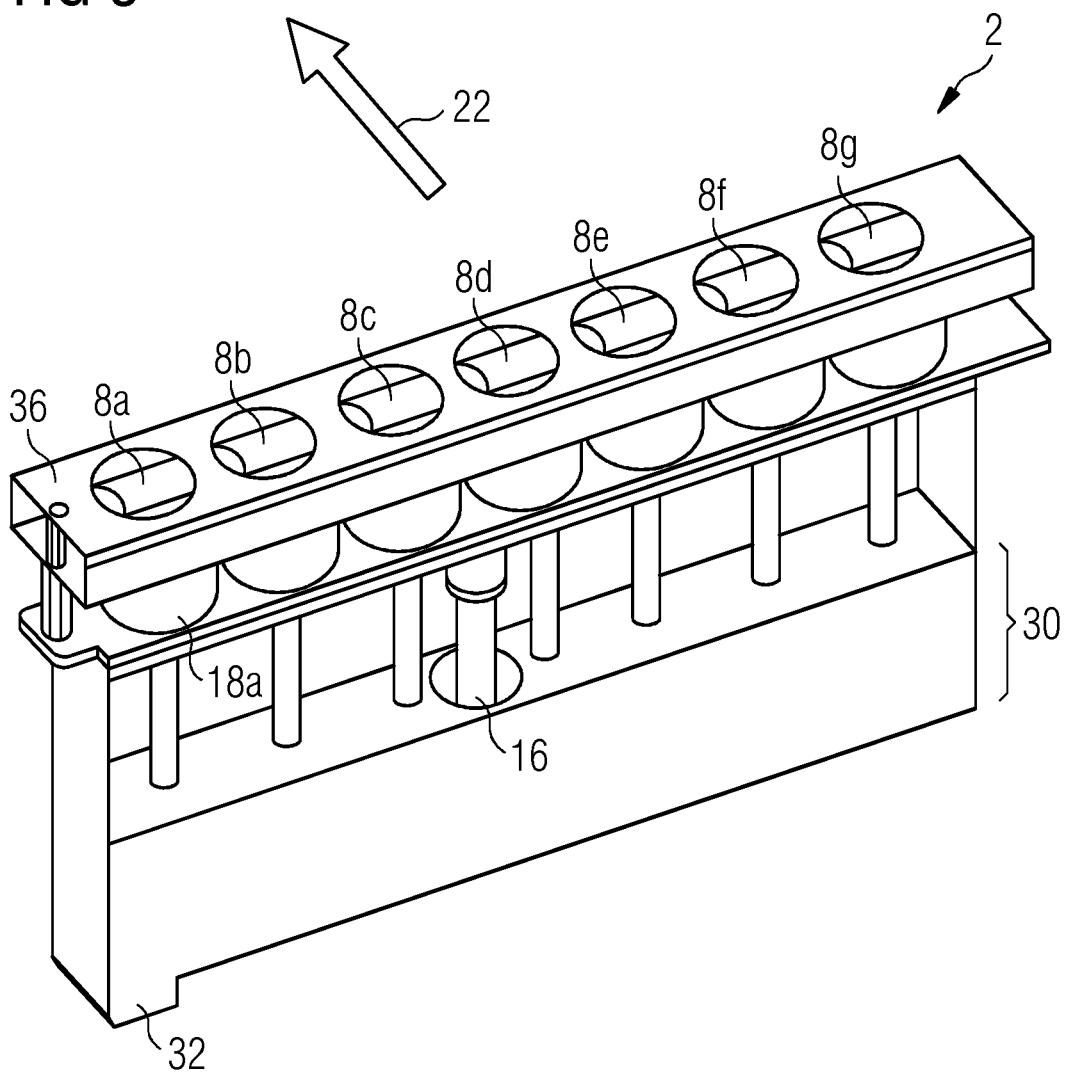

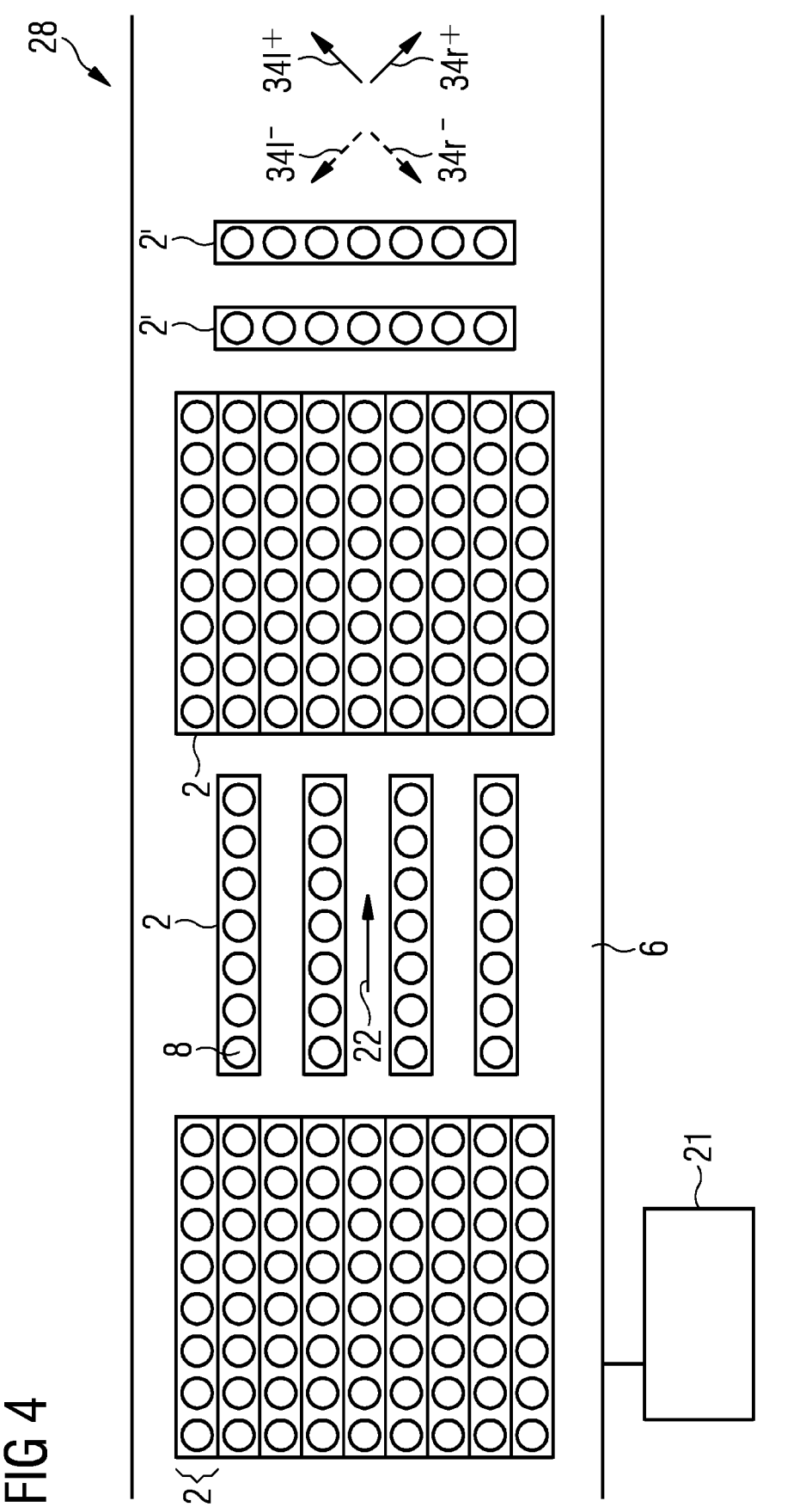

MODULAR CONVEYING UNIT

BACKGROUND OF THE INVENTION

Field of the Invention

The present invention relates to the technical field of conveying systems for goods.

Conveying units for conveying systems, in particular those which permit directed conveying by means of settable transport rollers, are configured to the size of the respective conveying system in a discrete manner by conventional structures. The transport rollers are mostly only able to be pivoted back and forth in a discrete manner between two or three positions, as is common for a switch for conveying systems. The driving mostly takes place in a belt-driven manner via a permanently installed drive element, which is situated below the actual transport roller. The drive elements are often unidirectional in design.

By discretely configuring the conveying unit to the size of the respective conveying system, the conveying unit is only suitable for the conveying system in question, wherein maintenance, installation and disassembly requires specialist knowledge and is associated with considerable outlay. The configuration of a superordinate control unit is likewise not trivial, as each built-in transport roller must be taken into consideration individually for the programming of the control unit. The transport rollers of current conveying units are additionally not able to be pivoted continuously and the drive elements situated below the transport rollers do not permit a simple changing of the transport direction.

SUMMARY OF THE INVENTION

The object underlying the present invention is therefore to provide an improved conveying unit which is simple to install. This object is achieved by the solution described in the independent claim.

The solution according to the invention provides a conveying unit for a superordinate conveying system for transporting goods on a transport plane. The conveying unit comprises transport rollers, drive means, at least one adjustment apparatus and a control unit. The transport rollers are able to be rotated about their respective axes of rotation at an actuatable rotational speed and with an actuatable direction of rotation. The drive means are embodied such that they can be actuated to drive the transport rollers. The axes of rotation of the transport rollers are embodied such that they can be actuated about their respective pivot axes by their own pivot axis angle and can be adjusted by rotation. The adjustment apparatus is embodied such that it can be actuated to adjust the axes of rotation of the transport rollers about their respective pivot axes. The control unit is embodied to actuate the conveying unit, in particular the adjustment apparatus and the drive means, and the conveying unit additionally comprises a connection apparatus for connecting the conveying unit to the superordinate conveying system.

The conveying unit according to the invention is suitable, depending on the embodiment, for various types of goods, for instance parcels and mail items, suitcases and baggage items, boxes, containers and pickable piece goods. Transporting is also intended to be understood in a broader sense as altering the orientation of the goods item without altering the center of gravity.

In order to transport the goods item with many degrees of freedom, at least two of the transport rollers may be able to be actuated differently from one another.

In this context, being able to be actuated differently from one another is intended to be understood as an ability of specific transport rollers or transport roller groups to be actuated individually with regard to the parameters of rotational speed, direction of rotation and pivot axis angle, wherein being able to be set individually may comprise all, two or only one of the parameters. The rotational speed being able to be actuated comprises both angular velocity and direction of rotation. Being able to be actuated, which is theoretically possible, also comprises a similar actuation of specific parameters or all of these parameters.

In accordance with one embodiment, the drive means can be embodied such that it can be actuated individually to drive a transport roller. Thus, the transport rollers can be actuated in a straightforward manner with rotational speed and direction of rotation differing from one another, whereby, with corresponding setting of the pivot axis angle, the goods item can also be transported in settable transport directions and simultaneously manipulated in terms of its orientation. The transport rollers of one conveying unit thus may be able to be driven in a positive direction of rotation and/or negative direction of rotation at the same and/or varying angular velocity. Thus a goods item can be rotated on the spot in a straightforward manner and further skillful manipulations of a flow of goods are also made possible.

In order to achieve a robust and precise regulation of the position, velocity and torque of the transport roller with simple actuation, the drive means may be embodied as a servo drive.

In accordance with a further embodiment, the connection apparatus may be embodied to supply power to the conveying unit. As this means that no additional terminal is necessary for the power supply, the installation of the conveying unit is particularly simple.

In order to enable a particularly straightforward installation and disassembly of the conveying unit, the connection apparatus may be embodied as a plug-in connection.

In accordance with a further embodiment, the connection apparatus may be embodied for signal transmission. Thus, signals can be relayed between the superordinate conveying system and the conveying unit in a reliable and low-interference manner, this being in addition to further functionalities in any case.

In order to enable, in a straightforward manner, an actuation which is coordinated with further T conveying units and/or with the superordinate conveying system, the control unit may be adapted to be actuated by a superordinate control facility.

In accordance with a further embodiment, the adjustment apparatus may be embodied for the shared adjustment of the axes of rotation of the transport rollers about their respective pivot axes. The transport rollers of one conveying unit, with regard to being able to set their pivot axis angles, are coupled in such a way, wherein the same and/or different pivot axis angles are able to be set collectively. The actuation of the conveying unit is thus less complicated as a result of fewer degrees of freedom of the adjustment.

In order to achieve a fine-tuning of the transport directions of the transport rollers, the adjustment apparatus may be embodied for the continuous adjustment of the axes of rotation of the transport rollers about their respective pivot axes.

In accordance with a further embodiment, the transport rollers may have a rounded surface in a region intended for contact with the goods, the axes of rotation may be arranged substantially parallel to the transport plane and the pivot axes may be arranged substantially orthogonal to the transport plane. Such transport rollers offer a large contact area between the transport roller surface and goods item, whereby a particularly efficient and precise force transmission and thus a particularly reliable transportation is made possible.

In order to protect the moving parts and bearings of the conveying unit from contamination and in order to construct as smooth a surface as possible with few interfering contours, the conveying unit may additionally comprise a cover apparatus, which has recesses for the transport rollers. The cover apparatus thus serves to protect both the goods and the conveying unit itself and additionally also prevents the limbs of an operator from becoming jammed in the unit.

In order to achieve a particularly high stability of the cover apparatus, the cover apparatus may be embodied as a closed profile. Profiles which are closed at least in their cross-section are able to withstand high levels of forces. Tubular profiles with a round or angular cross-section, but also sigma profiles, are typical embodiments of a closed profile.

In order to provide and use extensive conveying regions, two or more conveying units may be able to be arranged in any possible arrangement in relation to one another. Due to the modularity of the conveying units, it is thus possible for conveying units, which are tailor-made and yet simple to monitor and set up, to be constructed in a straightforward and rapid manner.

In accordance with one embodiment, the control units of two or more conveying units may be adapted to be actuated in a coordinated manner. Thus, a goods item may be transported and manipulated by more than one conveying unit simultaneously.

BRIEF DESCRIPTION OF THE SEVERAL VIEWS OF THE DRAWING

Embodiments of the invention are explained in greater detail below on the basis of the figures for instance, in which:

FIG. 1 schematically shows a conveying unit according to the invention;

FIG. 2 shows a conveying unit with shared adjustment apparatus;

FIG. 3 shows a further conveying unit with shared adjustment apparatus and cover apparatus; and FIG. 4 shows a conveying system with conveying units arranged in succession and side by side.

DESCRIPTION OF THE INVENTION

FIG. 1 shows, in accordance with one embodiment of the invention, in a schematic and cross-sectional representation, a conveying unit 2 comprises transport rollers 8a-8d which are embodied substantially in a similar manner for transporting goods 4 such as parcels or baggage items along a transport plane 6, wherein the main transport direction 22 looks into the image plane and the transport rollers 8a-8d span the transport plane 6. The transport rollers 8a-8d each have their own axes of rotation 10a-10d, their own actuatable drive means 18a-18d, their own pivot axes 12a-12d and their own transport roller bearings 24a-24d. A goods item 4 (not shown here) is transported along the transport plane 6 and/or its orientation is altered, as a function of its dimensions and its orientation, while resting on at least one or more of the transport rollers 8a-8d.

The transport rollers 8a-8d are able to be rotated with the aid of the drive means 18a-18d about their respective axes of rotation 10a-10d at a settable rotational speed which determines the transport velocity, wherein the magnitude and/or plus/minus sign of the rotational speeds may correspond with one another and/or differ from one another entirely or in groups. The rotational speed thus also comprises the direction of rotation. The transport rollers 8a-8d of the conveying unit 2 are thus able to be driven in a positive and/or negative direction of rotation. The drive means 8a-8d are embodied as direct drives, which are able to be regulated in all four quadrants spanned by torque and rotational speed (angular velocity and positive and negative direction of rotation) and thus enable active acceleration and active braking, as well as clockwise and counter-clockwise rotation. Integrated servo drives are particularly well-suited for precise individual setting and actuation, but other forms of drive means 18a-18d are also possible.

Each transport roller 8a has its own transport direction 34a, which is able to be regulated such that it can be actuated by setting the direction of rotation and pivot axis angle 14a. Here, a pivot axis angle 14a of 0° is defined via a transport direction 34a corresponding with the main transport direction 22 with a positive direction of rotation. In the case of a transport roller 8a embodied in the manner of a cylinder, which has a circumferential surface in the manner of a cylinder jacket in a region intended for contact with the goods 4, the pivot axis 12a is advantageously arranged orthogonal to the transport plane 6 and the axis of rotation 10a thus always remains parallel to and below the transport plane 6.

A transport roller 8 embodied in a rounded or curved manner would also be highly advantageous, when the pivot axis is arranged orthogonal to the transport plane 6, as a rounded embodiment, compared with an embodiment in the manner of a cylinder jacket, makes it easier to adjust the pivot axis angle 14a and has fewer interfering contours between transport roller 8a and goods item 4. A surface which is entirely or at least partially in the manner of the surface of a sphere represents a special case of a rounded surface.

The conveying unit 2 comprises a control unit 20, which is embodied for the optimized actuation of the conveying unit 2 and with which the drive means 18a-18d and the adjustment apparatuses 16a-16d are actuated. The conveying unit 2 comprises a connection apparatus 32, so that said conveying unit 2 is able to be connected to the superordinate conveying system 28 in a simple manner.

The pivot axis angle 14a is set by an actuatable adjustment apparatus 16a, by the transport roller 8a along with its axis of rotation 10a being rotated about their pivot axis 12a. The conveying unit 2 may comprises a single adjustment apparatus 16 for all transport rollers 8a-8d, or each transport roller 8a-8d is set by its own adjustment apparatus 16a-16d, as shown in FIG. 1. The adjustment apparatuses 16a-16d are able to be set individually and are embodied such that they can be actuated by the control unit 20 individually.

The transport rollers 8a-8d therefore have four degrees of freedom which are able to be set such that they can be actuated—rotational speed, direction of rotation and pivot axis angle, as well as torque—these being able to be set individually and able to be adjusted in the presence or absence of an item of piece goods 4. In this context, being able to be set individually also comprises that the setting of two or more of the listed degrees of freedom of two or more of the transport rollers 8*a*-8*d* corresponds and/or is able to be adjusted collectively. The transport rollers 8*a*-8*d* are therefore able to be rotated in a settable manner about their axes of rotation 10*a*-10*d* at the same and/or varying angular velocity, with a corresponding and/or differing direction of rotation and with corresponding and/or differing torque. The pivot axis angles 14*a*-14*d* of two or more transport rollers 8*a*-8*d* are able to be set in a manner which corresponds with and/or differs from one another.

The conveying unit 2 represents an optimized arrangement of transport rollers 8 with integrated drive means 18*a*-18*d* and compact adjustment apparatuses 16*a*-16*d* for the continuous actuation of the transport rollers 8*a*-8*d* with a control unit 20. The modularity in the arrangement of the conveying unit 2 enables a rapid and straightforward configuration of a conveying unit 2 of a superordinate conveying system 28.

The connection apparatus 32 is embodied for supplying power and/or for signal transmission, and thus can be actuated by a superordinate control facility 21 of the superordinate conveying system 28. The superordinate control facility 21 actuates the control unit 20 of the conveying unit 20 as a function of the position and orientation of the piece goods 4 on the transport plane 6.

The conveying unit 2 is able to be actuated such that the transport rollers 8*a*-8*d* may have corresponding rotational speed, corresponding direction of rotation and corresponding pivot axis angles 14*a*-14*d*. For a wide range of manipulations of goods, the conveying unit 2 is moreover able to be actuated such that at least two transport rollers 8 are able to be actuated differently from one another. Thus, some or all transport rollers may have individual settings for all or specific parameters, but it is also possible for the transport rollers 8*a*-8*d* to be set such that they correspond in groups. A differing setting of the transport rollers only has to relate to one of the degrees of freedom. Thus, for instance, a direction of rotation and/or angular velocity set to differ from one another, with corresponding setting of the pivot axis angles 14, is a differing setting of the transport rollers 8 overall.

In order to rotate a goods item 4, which rests equally on all four transport rollers with axes of rotation set parallel and corresponding pivot axis angles 14, on the spot, the two right-hand transport rollers 8*c*, 8*d* may be driven with a positive rotational direction and the two left-hand transport rollers 8*a*, 8*b* with a negative rotational direction, but corresponding magnitude, or vice versa in each case. Instead of driving the transport rollers 8*a*-8*d* with opposing rotational directions, the pivot axis angles 14*a*-14*d* could also be set as an alternative. The pivot axis angles 14*a*-14*d* are able to be set continuously.

At least two transport rollers 8, which can be set differently from one another, are required to rotate a goods item 4. With more transport rollers 8, the conveying of the goods item 4 is improved.

FIG. 2 shows, in accordance with a further embodiment of the invention, a modular conveying unit 2 comprising transport rollers 8*a*-8*h* arranged in an ordered manner along a line and a shared adjustment apparatus 16 for all transport rollers 8*a*-8*h*. The adjustment apparatus 16 is mechanically coupled to the transport rollers 8*a*-8*h* via an adjustment apparatus axis 16', meaning that the axes of rotation 10*a*-10*h* of all transport rollers 8*a*-8*h* are able to be adjusted by the pivot axis angle 14*a*-14*d* simultaneously and collectively. Thus, the transport rollers 8*a*-8*h* always have corresponding pivot axis angles 14 and the axes of rotation 10*a*-10*d* always remain parallel to one another. The adjustment apparatus 16 is embodied for a stepless setting of the pivot axis angles 14*a*-14*d*, which thus can adopt a free choice of angle values between 0° and 360°. The stepless setting of any possible angle values permits a highly precise setting of the transport direction 34*a*-34*d* of the transport rollers 8*a*-8*d*. In its interior, the conveying unit 2 comprises an electronics unit 30 which is compact in design, wherein said electronics unit 30, in addition to the control unit 20, comprises further components serving the electronics control and voltage supply in a compact embodiment.

The drive means 18*a*-18*h* are embodied as external motors which can be actuated separately and simultaneously act as jamming protection for additional safety. Drive means 18*a*, transport roller 8*a* and transport roller bearing 24*a* represent an integrated structural part. The transport rollers 8*a*-8*h* partially have a circumferential friction lining 26 for an improved gripping effect between transport roller 8 and goods item 4, meaning that the transfer of the movement of the transport roller 8 to the goods item is optimized. The friction lining is embodied to be durable and thus particularly low-maintenance.

In order to rotate a goods item 4, the drive means 18*e*-18*h* of the transport rollers 8*e*-8*h* positioned outwardly on the right may be driven such that they are actuated with a positive rotational speed and thus positive direction of rotation, and the drive means 18*a*-18*d* of the transport rollers 8*a*-8*d* positioned outwardly on the left with a negative rotational speed and thus negative direction of rotation. Due to the actuation of the drive means 18*a*-18*h* at different rotational speeds, as well as directions of rotation which correspond with and/or differ from one another, the goods item 4 is even able to be transported with a high variability in the case of corresponding pivot axis angles 14*a*-14*h*, and its orientation manipulated during transport or at a standstill.

The connection apparatus 32 is embodied as a plug-in connection, meaning that an installation of the conveying unit 2, in particular the connection to a superordinate controller 21 of the superordinate conveying system 28, is particularly straightforward. During the plugging-in, an automatic contacting takes place between conveying unit 2 and superordinate conveying system 28.

FIG. 3 shows a further conveying unit 2 with individually actuatable drive means 18*a*-18*g* for driving the transport rollers 8*a*-8*g* in accordance with another further embodiment of the invention. The conveying unit 2 is embodied similarly to that shown in FIG. 2, with a shared adjustment apparatus 16 for all transport rollers 8*a*-8*g*. The adjustment apparatus 16 is embodied to continuously adjust the axes of rotation 10*a*-10*g* of the transport rollers 8*a*-8*d* about their respective pivot axes 12*a*-12*g*. The pivot axis angles 14*a*-14*g* are thus able to adopt any possible values, wherein it is also possible to restrict the angular range. By regulating the direction of rotation and pivot axis angle 14*a* in the range of +−90°, it is nonetheless possible to achieve any possible transport direction 34*a* of the transport roller 8*a*. The restriction of the pivot axis angle 14*a* simplifies a constructive implementation of the conveying unit 2, in particular the rotatively movable fastening of the transport roller bearing 24. In the main use of the conveying unit 2 for conveying along the main transport direction 22, a restriction of the pivot axis angles in the range of +−45° may also be sensible.

The conveying unit 2 comprises a cover apparatus 36, which has recesses for the transport rollers 8*a*-8*g*. On the one hand, the cover apparatus 36 serves as jamming protection for goods 4 and operating personnel, but on the other hand it also serves as protection from contamination of the moving parts and bearings of the conveying unit 2. The measurements of the cover apparatus 36 are adapted to the dimensions of the modular conveying unit 2 such that two conveying units 2 which are positioned directly adjacent to one another sit flush. The cover apparatus 36 shown here is embodied as a three-dimensional, elongated and angular hollow body and thus as a closed profile. Closed profiles and further hollow body shapes of the cover apparatus 36 lend the arrangement of the conveying unit 2 a particular high degree of stability and also additionally protect the components to the side and from below. The embodiment as a closed profile is advantageous for a high degree of stability, with a wide range of contours of the profile being possible, for instance round or angular tube shapes, sigma profiles which are simple or folded multiple times. However, other embodiments of the cover apparatus 36 such as simple cover plates, which have recesses for the transport rollers 8a-8g, are also possible. The recesses are made in a straightforward manner from a blank of the cover apparatus by punching-out, sawing-out or cutting-out by means of a laser beam or water jet or simply using a mechanical cutting tool.

FIG. 4 shows, in accordance with one embodiment of the invention, a conveying system 28 with conveying units 2, 2', which are arranged at regular intervals in succession and side by side, and are arranged along the main transport direction 22 and at a right angle thereto. The arrangement of the conveying units 2, which can be set and actuated individually, is partially similar to a roller mat and partially strip-like. The regions similar to a roller mat are particularly suitable for altering the orientation of goods; the other regions are especially suitable for simple transportation along the main transport direction 22.

The pivot axis angles 14 of a conveying unit 2 oriented along the main transport direction 22 may adopt continuous values between +45° and −45°. The transport directions 34$^+$ possible with a positive rotational speed and thus positive direction of rotation lie between 34$l^+$ and 34$r^+$; the transport directions 34$^-$ possible with a negative rotational speed and thus negative direction of rotation lie between 34$l^-$ and 34$r^-$. As the possible transport directions 34$^+$, 34$^-$ of the conveying units 2' arranged transverse to the main transport direction are rotated by 90° compared to the transport directions 34$^+$, 34$^-$ indicated, they are especially suitable for steering the goods 2 to the right or left. The transport velocity of the conveying units 2, 2' is determined by the angular velocity of their transport rollers 8.

The conveying units 2 are not only able to be arranged along or orthogonal to the main transport direction 22, but also in any possible arrangement with respect to one another and at any possible angle to the main transport direction 22. The superordinate control facility 21 of the conveying system 28 actuates the control units 20 of the specific conveying units 2, 2' in a coordinated manner, wherein the actuation can take place while taking into consideration the position and orientation of goods 4 captured by detectors. The superordinate control facility 21 coordinates the actuation of the specific control units 20 configured for actuation by a superordinate control facility 21, so that the goods transport is performed in an optimized manner along the entire conveying system 28.

In accordance with a further embodiment, the transport rollers 8 of a conveying unit 2 are arranged in a non-linear manner, for example in a circle shape, and are thus even better suited for rotating a goods item 4.

In accordance with a further embodiment, the conveying unit 2 is embodied to be actuated via a communications protocol, for instance CAN or CANopen.

LIST OF REFERENCE CHARACTERS 2 conveying unit
4 goods item
6 transport plane
8 transport roller
10 axis of rotation
12 pivot axis
14 pivot axis angle
16 adjustment apparatus
16' adjustment apparatus axis
18 drive means
20 control unit
21 superordinate control facility
22 main transport direction
24 transport roller bearing
26 friction lining
28 conveying system
30 electronics unit
32 connection apparatus
34 transport direction
36 cover apparatus

The invention claimed is:

1. A conveying unit for a superordinate conveying system for transporting goods on a transport plane, the conveying unit comprising:
a plurality of transport rollers mounted for rotation about respective axes of rotation at an actuatable rotational speed and with an actuatable direction of rotation, said plurality of transport rollers being disposed only in a single row or only in a single column to thereby form a strip;
drive devices configured for driving said transport rollers;
the axes of rotation of said transport rollers being pivotable about respective pivot axes by a pivot axis angle;
an adjustment apparatus configured for adjusting an orientation of the axes of rotation of said transport rollers by rotation about the respective pivot axes;
a control unit configured for actuating said adjustment apparatus and said drive devices; and
a connection apparatus for connecting the conveying unit to the superordinate conveying system;
wherein the conveying unit is a modular unit.

2. The conveying unit according to claim 1, wherein at least two of said transport rollers are able to be actuated differently from one another.

3. The conveying unit according to claim 1, wherein said drive devices are configured for individual actuation so as to individually drive a respective one of the transport rollers.

4. The conveying unit according to claim 3, wherein said drive devices are embodied as a servo drives.

5. The conveying unit according to claim 1, wherein said connection apparatus is configured for supplying power to the conveying unit.

6. The conveying unit according to claim 5, wherein said connection apparatus is a plug-in connection.

7. The conveying unit according to claim 1, wherein said connection apparatus is configured for relaying signals between the conveying unit and a superordinate control facility.

8. The conveying unit according to claim 1, wherein said control unit is adapted to be actuated by a superordinate control facility.

9. The conveying unit according to claim 1, wherein said adjustment apparatus is configured for a shared adjustment of the axes of rotation of said transport rollers about their respective pivot axes.

10. The conveying unit according to claim 1, wherein said adjustment apparatus is configured for a continuous adjustment of the axes of rotation of said transport rollers about their respective pivot axes.

11. The conveying unit according to claim 1, wherein said transport rollers have a rounded surface in a region intended for contact with the goods, the axes of rotation are arranged substantially parallel to the transport plane and the pivot axes are substantially orthogonal to the transport plane.

12. The conveying unit according to claim 1, further comprising a cover apparatus formed with recesses for said transport rollers.

13. The conveying unit according to claim 12, wherein said cover apparatus is embodied as a closed profile.

14. A conveying system, comprising: at least two of the conveying units according to claim 1.

15. The conveying system according to claim 14, wherein said control unit of each of said at least two of the conveying units is configured for coordinated actuation.

16. The conveying unit according to claim 1, wherein said control unit is configured to individually control a speed of rotation of each of said drive devices and to individually control a direction of the rotation of each of said drive devices.

* * * * *